(12) United States Patent
Matsuura et al.

(10) Patent No.: US 6,711,970 B2
(45) Date of Patent: Mar. 30, 2004

(54) DEVICE FOR MEASURING TORQUE WITH HIGH ACCURACY

(75) Inventors: Mutsumi Matsuura, Ota-ku (JP); Taiichi Miya, Ota-ku (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/253,477

(22) Filed: Sep. 25, 2002

(65) Prior Publication Data

US 2003/0056606 A1 Mar. 27, 2003

(30) Foreign Application Priority Data

Sep. 26, 2001 (JP) ........................................ 2001-293599

(51) Int. Cl.[7] .............................. G01L 3/02; G01L 3/10; G01L 3/12; G01L 3/14
(52) U.S. Cl. ............................... 73/862.328; 73/862.331
(58) Field of Search ...................... 73/862.08, 862.325, 73/855, 862.328, 862.331, 862.334, 862.193; 318/254, 432, 640; 310/266; 180/140, 446, 412, 422, 444

(56) References Cited

U.S. PATENT DOCUMENTS

| | | | | |
|---|---|---|---|---|
| 5,012,169 A | * | 4/1991 | Ono et al. .................. 318/568 |
| 5,038,065 A | * | 8/1991 | Matsubayashi et al. ..... 310/162 |
| 5,327,790 A | * | 7/1994 | Levin et al. ............ 73/862.325 |
| 5,744,895 A | * | 4/1998 | Seguchi et al. |
| 5,988,307 A | * | 11/1999 | Yamada et al. ............. 180/243 |
| 6,087,734 A | * | 7/2000 | Maeda et al. ............. 290/40 C |
| 6,161,640 A | * | 12/2000 | Yamaguchi ................ 180/65.8 |

* cited by examiner

*Primary Examiner*—Edward Lefkowitz
*Assistant Examiner*—Octavia Davis
(74) *Attorney, Agent, or Firm*—Oliff & Berridge, PLC

(57) ABSTRACT

This invention is to provide an improved device for measuring torque with high accuracy and a simple structure. The device is so constructed that one end of a torsion bar (which is twisted depending on an actual steering operation) is combined with one end of an input shaft, while the other end of the torsion bar is combined with one end of an output shaft. The other end of the input shaft is combined with a steering wheel, while the other end of the output shaft is connected to vehicle wheels. A rotor of a first resolver comprising the rotor having a resolver excitation winding and a stator having a resolver output winding is fixed to the input shaft (one end of which is combined with the steering wheel). A rotor of a second resolver comprising the rotor having a resolver excitation winding and a stator having a resolver output winding is fixed to the output shaft (the other end of which is connected to the vehicle wheels). The output shaft and the input shaft are all fixed with the torsion bar, while the first and second resolvers are formed into an integrated structure.

11 Claims, 7 Drawing Sheets

DEVICE FOR MEASURING TORQUE WITH HIGH ACCURACY

BACKGROUND OF THE INVENTION

1. Field of the Invention

The present invention relates to a vehicle steering apparatus, particularly to a device for measuring torque with high accuracy for use as a vehicle steering apparatus in which resolvers are used as a turning angle detector.

2. Description of the Related Art

In general, moving or stopped vehicle wheels (in contact with a road surface) turn to a certain orientation once the steering wheel of the vehicle is turned by a driver. However, since there is a friction force acting between the wheels and the road surface, it is impossible for the wheels to turn to exactly the same angle as the steering wheel because of a transmission loss involved in a motive force transmitting process.

In order to solve the above problem, it is necessary to measure and then compensate for a difference between the turning angle of the steering wheel and that of the vehicle wheels. Traditionally, what has been in actual use is a torque sensor since it can provide such a desired function. Namely, the torque sensor can be used to measure a deviation between the turning angle of the steering wheel and that of the vehicle wheels. Meanwhile, a driving means provided independently of the torque sensor is used to rotate the vehicle wheels in response to an extent of the measured deviation In this way, it is possible to always steer the vehicle in a correct direction as directed by the driver.

FIG. 5 is a perspective view showing an external appearance of a torque sensor used in a conventional vehicle steering apparatus having the aforementioned functions. FIG. 6 is a partially enlarged explanatory view showing a part of the torque sensor shown in FIG. 5. As shown in the drawings, the conventional torque sensor comprises an input shaft 72 whose one end is combined with a steering wheel 71, an output shaft 74 whose one end is connected to the vehicle wheels, and a torsion bar 73 which is deformed to a certain extent corresponding to an actual steering operation. Further, three detection rings 66 to 68 are provided between the input shaft 72 and the output shaft 74. In fact, these detection rings 66 to 68 are all made of a magnetic material and arranged with spaces between one another at a predetermined interval between the input shaft 72 and the output shaft 74. Specifically, the first detection ring 66 is combined with the external surface of the input shaft 72 closer than any other detection rings to the steering wheel 71, and is rotatable at exactly the same angle with the steering wheel 71. The second detection ring 67 is combined with the outer peripheral surface of the central portion of the torsion bar 73. The third detection ring 68 is combined with the external surface of one end of the output shaft 74, which is the end connected to the vehicle wheels and is rotatable at substantially the same angle with the vehicle wheels.

Further, one end face of the first detection ring 66 (which is in fact an end face facing the second detection ring 67), is formed into a tooth section. Similarly, an end face of the second detection ring 67 and an end face of the third detection ring 68 (the two end faces are facing each other) are also each formed with tooth sections. Moreover, a coil (first coil) 61 is wound around an interval between the first and second detection rings 66 and 67, while another coil (second coil) 70 is wound around an interval between the second and third detection rings 67 and 68. Specifically, both of the coils 61 and 70 are all connected to a processing unit 69.

Next, the description will be given to explain an operation of the conventional torque sensor constructed in the above-described manner, which is for use as a vehicle steering apparatus in a vehicle. Namely, once a driver turns the steering wheel 71, the input shaft 72, the output shaft 74 and the torsion bar 73 are rotated. At this time, one end of the torsion bar 73 (which is connected to the steering wheel 71) is twisted larger and thus rotate more than the other end of the torsion bar 73 which is connected to the vehicle wheels. In other words, when the steering wheel 71 is turned (revolved), a friction force acting between the vehicle wheels and the road surface brings the following results. The rotation angle of the first detection ring 66 is larger than the rotation angle of the second detection ring 67, while the rotation angle of the second detection ring 67 is larger than the rotation angle of the third detection ring 68.

In this way, although there is almost no change in the mutually facing area between the tooth section of the first detection ring 66 and the second detection ring 67, there is a change in the mutually facing area between the tooth section of the second detection ring 67 and the tooth section of the third detection ring 68. For this reason, there is a change in an external magnetic flux between the second detection ring 67 and the third detection ring 68, thus causing a change in the magnetic flux passing through the second coil 70. Here, the inductances of the first and second coils 61 and 70 are set at exactly the same value. Accordingly, with the rotation of the steering wheel 71, although there is not, any change in the magnetic flux passing through the first coil 61, there is a change in the magnetic flux passing though the second coil 70. In this way, by measuring a change in an induced electromotive force of the second coil 70 with respect to an induced electromotive force of the first coil 61, it is possible to measure a rotational deviation between the steering wheel 71 and the vehicle wheels.

On the other hand, there has long been known another device called a resolver which comprises a rotary transformer as shown in FIG. 7. In fact, such a resolver includes a rotary shaft 50, a rotor 54 mounted on the rotary shaft 50, a resolver excitation winding 58 wound around the rotor, an inner core 56, and a transformer output winding 60 wound around the inner core 56. Actually, all these elements are rotatably mounted by means of bearings 51A and 51B located within a casing 52. Further, the casing 52 also encloses a stator 53, a resolver output winding 57 wound around the stator 53, an outer core 55, and a transformer excitation winding 59 wound around the outer core 55.

An excitation voltage applied to the transformer excitation winding 59 is induced in the transformer output winding 60, by virtue of an action of the rotary transformer formed by the outer core 55 and the inner core 56. The voltage induced in the transformer output winding 60 is then applied to the resolver excitation winding 58. In this way, X and Y components of the rotation angle are correspondingly outputted to the resolver output winding 57 with the rotation of the rotary shaft 50, respectively.

As described above, the conventional torque sensor shown in FIGS. 5 and 6 has three detection rings and two coils, forming a mutually facing area between the tooth section of the first and second detection rings 66 and 67, and another mutually facing area between the tooth sections of the second and third detection rings 67 and 68. In fact, there is a relative change in each of the above two mutually facing areas, and such a relative change causes a change in an induced electromotive force, so that it is possible to measure a difference between the induced electromotive forces of the first and second coils 61 and 70.

However, although the input shaft 72, the output shaft 74 and the torsion bar 73 are rotated once the steering wheel 71 is turned, at this time, one end of the torsion bar 73 connected to the steering wheel 71 is twisted larger and thus rotate more than the other end of the torsion bar 73 connected to the vehicle wheels. Accordingly, there is only a reduced change in a mutually facing area between the tooth sections of the second and third detection rings 67 and 68. As a result, it is impossible to measure torque with high accuracy. Moreover, since the torque sensor includes a large number of parts forming it, it is necessary to perform various adjustments for these parts.

On the other hand, the resolver comprising the rotary transformer shown in FIG. 7 is associated with a problem called a magnetic flux leakage. Namely, magnetic flux leaks from the outer core 55, the inner core 56, the transformer excitation winding 59 and the transformer output winding 60, which together form the rotary transformer. In fact, the magnetic flux leakage induces a sort of noise voltage in the resolver excitation winding 58 and the resolver output winding 57, thus deteriorating the measurement accuracy of the resolver. In fact, this problem is particularly remarkable with a resolver having a high sensitivity.

SUMMARY OF THE INVENTION

Accordingly, it is an object of the present invention to provide an improved device for measuring torque with high accuracy and a simple structure, thereby solving the aforementioned problems.

A device for measuring torque with high accuracy according to a first aspect of the present invention, comprises a first resolver and a second resolver which are formed in an integrated structure, each of the first and second resolvers including a rotor having a resolver excitation winding and a stator having a resolver output winding for outputting X and Y components of each rotation angle in accordance with the rotation of the rotor. In particular, one end of the rotor of the first resolver is fixed with an input shaft combined with a steering wheel, and the other end of the rotor of the second resolver is fixed with an output shaft combined with vehicle wheels, while the input shaft and the output shaft are both fixed with a torsion bar.

A device for measuring torque with high accuracy according to a second aspect of the present invention, further comprises inner cores formed on the rotors of the first and second resolvers, which the inner cores have rotary transformer output windings; outer cores formed on the stators of the first and second resolvers, which the outer cores have rotary transformer excitation windings; the inner cores, the rotary transformer output windings, the outer cores and the rotary transformer excitation windings together form a rotary transformer, providing such a structure that voltages induced in the rotary transformer output windings by virtue of the rotary transformer are applied to the resolver excitation windings of the rotors, thereby obtaining output voltages corresponding to actual rotation angles of the rotors from the resolver output windings. Specifically, a first shield plate is disposed between the inner core and the resolver excitation winding, and a second shield plate is disposed between the outer core and the resolver output winding. In particular, the first shield plate is formed with a notched hole allowing passing therethrough of a cross-over wire for use in connecting the rotary transformer output winding with the resolver excitation winding. More specifically, the notched hole is formed as having a slope and extending between the rotary transformer output winding and the resolver excitation winding.

In the device for measuring torque with high accuracy according to a third aspect of the present invention, shield plates are provided between the first resolver and the second resolver.

In the device for measuring torque with high accuracy according to a fourth aspect of the present invention, the first and second resolvers are arranged opposite to each other, the resolver excitation windings of the two resolvers are arranged opposite to each other, and the resolver output windings of the two resolvers are also arranged opposite to each other.

In the device for measuring torque with high accuracy according to a fifth aspect of the present invention, the shield plates provided between the first resolver and the second resolve are respectively disposed between the resolver excitation windings and the resolver output windings.

In the device for measuring torque with high accuracy according to a sixth aspect of the present invention, each shield plate provided between the first resolver and the second resolver is a ring-like member.

In the device for measuring torque with high accuracy according to a seventh aspect of the present invention, the first and second shield plates are ring-like members.

In the device for measuring torque with high accuracy according to an eighth aspect of the present invention, the notched hole formed in the first shield plate is located close to either the output shaft or the input shaft.

DESCRIPTION OF THE PREFERRED EMBODIMENTS

Figure 1:
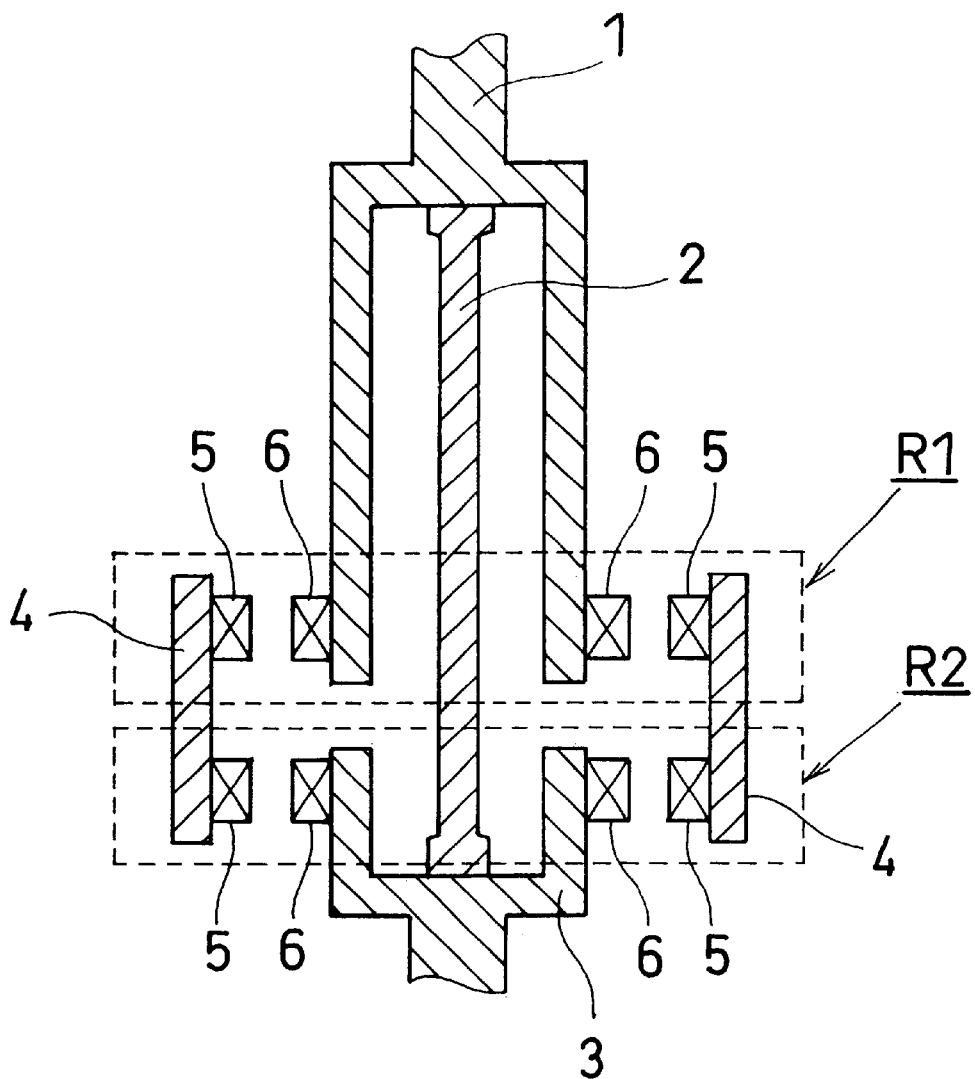
FIG. 1 is an explanatory view schematically showing an arrangement around a torsion bar in a device for measuring torque with high accuracy according to the present invention.

An embodiment of the present invention will be described in the following with reference to the accompanying drawings. FIG. 1 is an explanatory view generally showing a structure around a torsion bar of a device for measuring torque with high accuracy according to the present invention.

Referring to FIG. 1, one end of a torsion bar 2 (which is twisted depending on an actual steering operation) is combined with one end of an input shaft 1, while the other end of the torsion bar 2 is combined with one end of an output shaft 3. The other end of the input shaft 1 is combined with a steering wheel (not shown), while the other end of the output shaft 3 is connected to vehicle wheels (not shown).

A first resolver R1 comprises a rotor including a resolver excitation winding 6 and a stator including a resolver output winding 5 for outputting the X and Y components of each rotation angle in accordance with the rotation of the rotor. Specifically, the rotor is fixed to the input shaft 1 (one end of which is combined with the steering wheel). Similarly, a second resolver R2 comprises a rotor including the resolver excitation winding 6 and a stator including the resolver output winding 5 for outputting the X and Y components of each rotation angle in accordance with the rotation of the rotor. Specifically, the rotor is fixed to the output shaft 3 (the other end of which is connected to the vehicle wheels).

The output shaft 3 and the input shaft 1 are all fixed with the torsion bar 2, so that the first and second resolvers R1 and R2 are formed into an integrated structure. In other words, the stators of the first and second resolvers R1 and R2 are formed into an integrated structure by virtue of a housing 4, and fixed in a predetermined position (not shown) within the vehicle. In particular, the rotor of the first resolver R1 is combined with the external surface of the input shaft 1, while the rotor of the second resolver R2 is allowed to rotate integrally with the output shaft 3.

An operation of the torque measuring apparatus having the above-described structure is explained in the following. Namely, once a driver turns a steering wheel (not shown), the input shaft 1, the output shaft 3 and the torsion bar 2 are all rotated. At this time, one end of the torsion bar 2 (which is combined with the steering wheel) is twisted larger and thus rotate more than the other end of the torsion bar (which is connected to the vehicle wheels). In other words, when the steering wheel is turned, a friction force acting between the vehicle wheels and the road surface brings the following results. The input shaft 1 has the largest rotation angle which is larger than the rotation angle of the torsion bar 2, while the torsion bar 2 has a rotating angle which is larger than the rotation angle of the output shaft 3.

When the rotors of the resolvers rotate with respect to the stators, an output corresponding to a rotation angle can be obtained. In fact such an output can be measured as the magnitude of a torque, i.e., as a turning angle of the, steering wheel. As described above, when the steering wheel is turned, since there is a friction force acting between the vehicle wheels and road surface, the rotation angle of the rotor in the first resolver R1 provided on the input shaft 1 is larger than the rotation angle of the rotor in the second resolver R2 provided on the output shaft 3.

Specifically, the outputs of the first and second resolvers R1 and R2 are respectively connected to their corresponding resolver digital circuits (which are well known in the art, but not shown in the drawing), so as to be detected as the respective rotation angles. Here, each of the resolver digital circuits is capable of digitally producing an output through a corresponding output winding, in response to a rotation angle of the rotor of each resolver. Further, both of the resolver digital circuits are connected to a digital computing circuit (not shown) for obtaining an output difference between two outputs fed from the two digital circuits. By virtue of the digital computing circuit, it is possible to obtain an output difference between the first and second resolvers R1 and R2, i.e., obtain a twisting amount between the input shaft and the output shaft.

Figure 2:
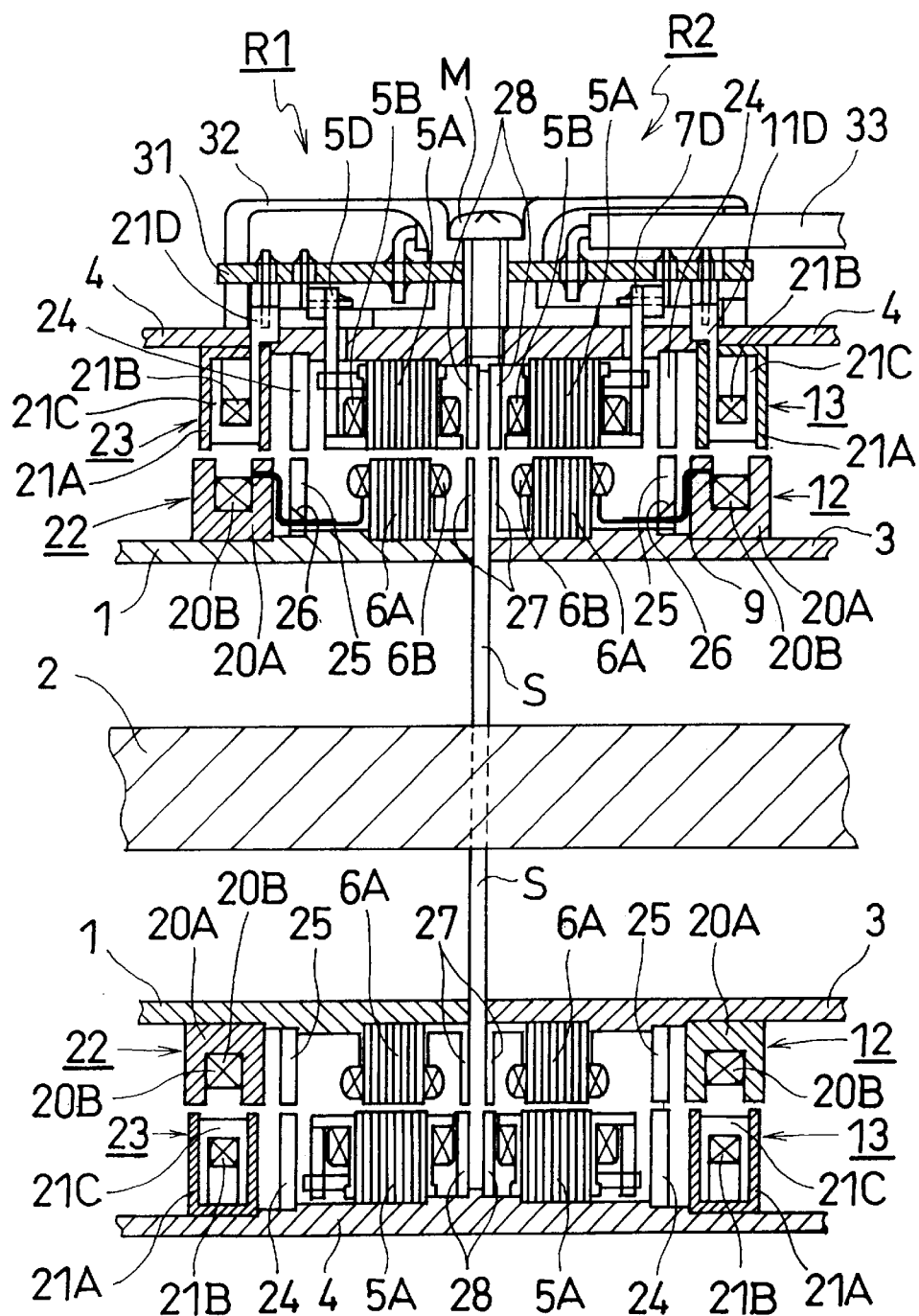
FIG. 2 is a cross sectional view showing a rotary transformer type resolver assembly provided in the device for measuring torque with high accuracy of the present invention.

FIG. 2 is a cross sectional view showing in more detail the resolvers of the device for measuring torque with high accuracy according to the present embodiment. As shown in the drawing, the torsion bar 2 is arranged within the inner side of each of the input shaft 1 and the output shaft 3. Actually, both of the input shaft 1 and the output shaft 3 are cylindrically shaped, and are separated from each other by a space S. In fact, the first resolver R1 has a rotor 22 fixed on the external surface of the input shaft 1, while the second resolver R2 has a rotor 12 fixed on the outer peripheral surface of the output shaft 3.

Close to the outer peripheral surfaces of the rotors 22 and 12, there are provided stators 23 and 13 which are formed into an integrated structure by virtue of the housing 4, and fed in the predetermined positions (not shown) within the vehicle. There are provided a base plate 31 and a base plate cover 32 which are both fixed on the housing 4 by virtue of a screw M on the outer peripheral surface of the housing 4. Actually, the base plate 31 is connected with the respective output terminals of various lead wires used in the first and second resolvers R1 and R2 and a rotary transformer which will be described later. The other end of each of the lead wires is led out by means of a cable 33. Specifically, the respective outputs of the first and second resolvers R1 and R2 are connected with the resolver digital circuits in the manner described above. In this way, with the use of the aforementioned digital computing circuit, it is possible to obtain an output difference between the first and second resolvers R1 and R2, representing a twisting amount occurring between the input shaft and the output shaft.

Although the first and second resolvers R1 and R2 are installed in different positions, they have the same identical structure. Accordingly, the following description will be made to explain only the resolver R1 with identical elements being represented by identical reference numerals. Specifically, the rotor 22 of the first resolver R1 fixed on the outer peripheral surface of the input shaft 1 has the following structure. Namely, a rotary transformer output winding 20B is wound around an inner core 20A, and provided at an end (the farthest position from the second resolver R2) of the rotor 22.

The resolver excitation winding 6B of the rotor 22 is wound around a magnetic pole 6A and located on the inner side (close to the second resolver R2) of the inner core 20A. Further, a first ring-like rotor shield plate 25 is provided between the inner core 20A and the resolver excitation winding 6B/magnetic pole 6A. A cross-over wire 9 is connected between the output winding 20B of the rotary transformer and the resolver excitation winding 6B. In particular, the first rotor shield plate 25 is formed with a notched hole 26 allowing the passing of the cross-over wire 9 therethrough. Specifically, the notched hole 26 is formed so that it has a slope (which will be described later) and extends between the output winding 20B of the rotary transformer and the resolver excitation winding 6B. In order to decrease an undesired influence possibly caused by magnetic flux leakage, the notched hole 26 is disposed in the vicinity of the input shaft 1.

Further, a second ring-like rotor shield plate 27 is provided on the inner side of the resolver excitation winding 6B/magnetic pole 6A (close to the second resolver R2). In fact, the second ring-like rotor shield plate 27 is disposed at an end of the input shaft 1 (a position closest to the output shaft 3).

The rotor 12 is disposed in a position symmetrical with the rotor 22. In this way, the first ring-like rotor shield plate 25 is positioned opposite to the second ring-like rotor shield plate 27.

The following description will be given to explain the structure of the stator 23 which is located close to the outer peripheral surface of the rotor 22 and fixed on the inner side of the housing 4. Namely, a rotary transformer excitation winding 21B is wound around a bobbin 21C. And, together with an outer core 21A, the output side of the rotary transformer is provided at one end (a position farthest from the second resolver R2) of the stator 23.

A resolver output winding of the stator 23 is wound around a magnetic pole 5A, and located on the inner side (dose to the second resolver R2) of the outer core 21A. Further, a first ring-like stator shield plate 24 is provided between the outer core 21A and the resolver output winding 5B/magnetic pole 5A.

Further, a second ring-like stator shield plate 28 is provided on the inner side (close to the second resolver R2) of the resolver output winding 5B/magnetic pole 5A. In fact, the second ring-like stator shield plate 28 is provided on the outer side of the second rotor shield plate 27.

The stator 13 is disposed in a position symmetrical with the stator 23, in a manner such that the second ring-like stator shield plate 28 is caused to face the second ring-like stator shield plate 28.

In this way, the rotary transformer is composed of the inner core 20A, the rotary transformer output winding 20B, the outer core 21A and the rotary transformer excitation winding 21B. Accordingly, a voltage induced in the rotary transformer output winding 20B by virtue of the rotary transformer may be applied to the resolver excitation winding 6B of the rotor, thereby obtaining from the resolver output winding 5B an output voltage corresponding to an actual rotation angle of the rotor. Further, the resolver output winding 5B capable of outputting the X and Y components of rotation angle (not shown) is wound around the magnetic pole 5A using a known method in the art.

The rotary transformer excitation winding 21B and the resolver output winding 5B of the first resolver R1 are led out of the housing 4 and connected respectively to the base plate 31 by way of terminals 21D and 5D. Moreover, the rotary transformer excitation winding 21B and the resolver output winding 5B of the second resolver R2 are also connected respectively to the base plate 81 by way of terminals 11D and 7D.

Figure 3A:
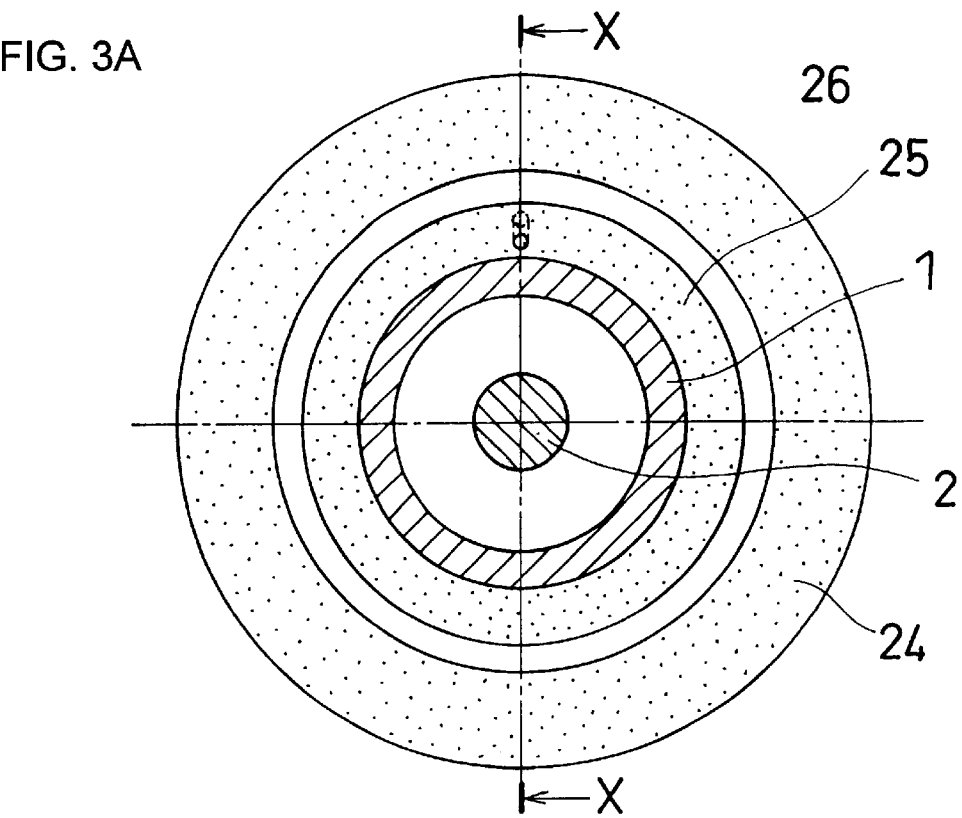
FIG. 3A is a front view showing a first stator shield plate.
Figure 3B:
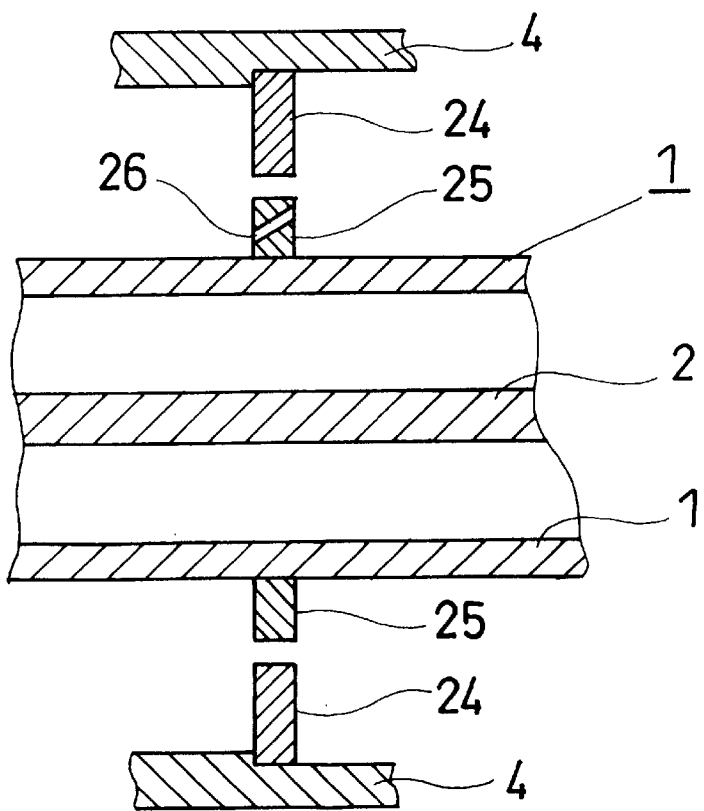
FIG. 3B is a sectional view taken along X—X line in FIG. 3A showing a first, rotor shield plate.

FIGS 3A and 3B provide explanatory views showing the first ring-like stator .shield plate 24 provided between the outer core 21A and the resolver output winding 5B/magnetic pole 5A, and the first ring-like rotor shield plate 25 provided between the inner core 20A and the resolver excitation winding 6B/magnetic pole 6A. In detail, FIG. 3A is a front view showing the first resolver R1 and FIG. 3B is a sectional view taken along X—X line in FIG. 3A. Here, the first ring-like stator shield plate 24 and the first ring-like rotor shield plate 25 are all made of a magnetic material such as iron.

As shown in FIG. 3, the notched hole 26 is formed in the first rotor shield plate 25 attached to the outer peripheral surface of the input shaft 1 in a manner such that it is in perpendicular relation with the input shaft 1, ensuring that the notched hole 26 is located in the vicinity of the input shaft 1. The diameter of the first rotor shield plate 26 should be made large enough to sufficiently block a magnetic flux leaking from the inner core 20A forming the rotary transformer to the magnetic pole 6A, or to block a magnetic flux leaking from the magnetic pole 6A to the inner core 20A. Actually, the diameter of the first rotor shield plate 25 should be sized such that it does not come into contact with the first stator shield plate 24.

The first stator shield plate 24 is externally provided on the first rotor shield plate 25, in a manner such that the stator shield plate is perpendicular to both the housing 4 and the input shaft 1. Specifically, the diameter of the first stator shield plate 24 should be made large enough to sufficiently block a magnetic flux leaking from the outer core 21A forming the rotary transformer to the magnetic pole 5A, or to block a magnetic flux leaking from the magnetic pole 5A to the outer core 21A. Actually, the diameter of the first stator shield plate 24 should be sized such that it does not come into contact with the first rotor shield plate 25.

Figure 4:
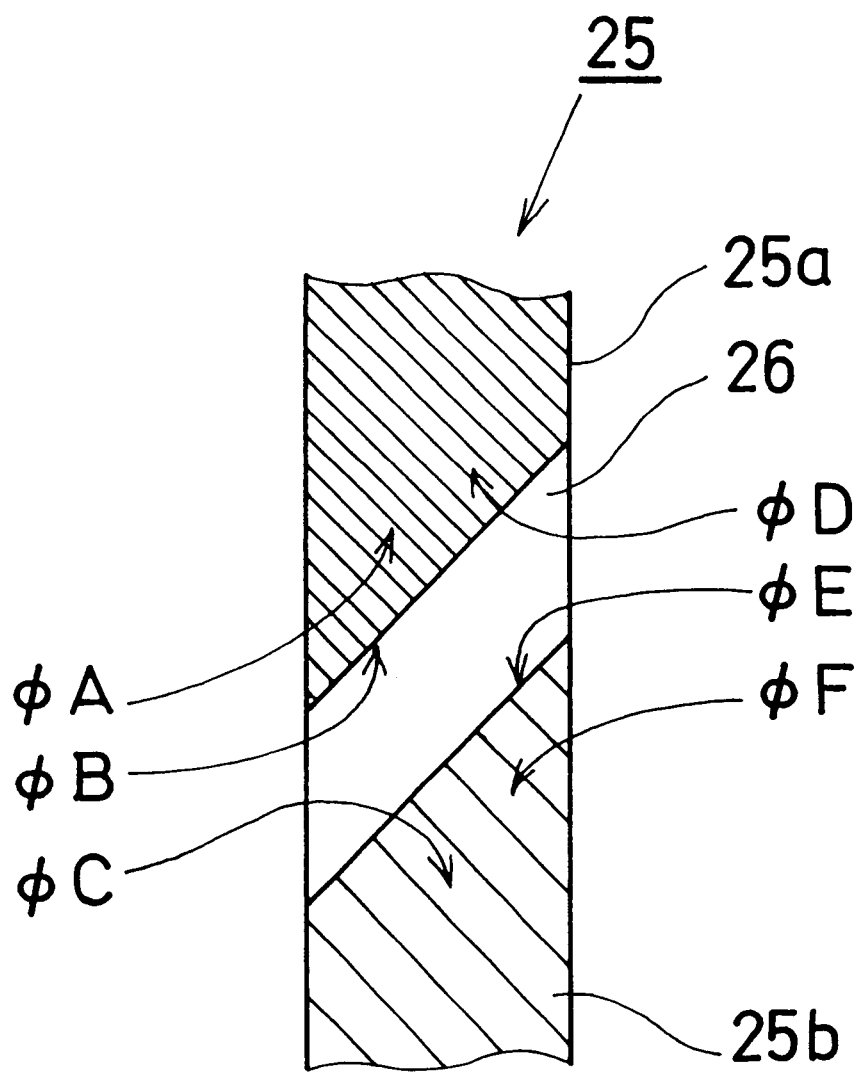
FIG. 4 is an enlarged view showing a notched hole and its surrounding structure.
Figure 5:
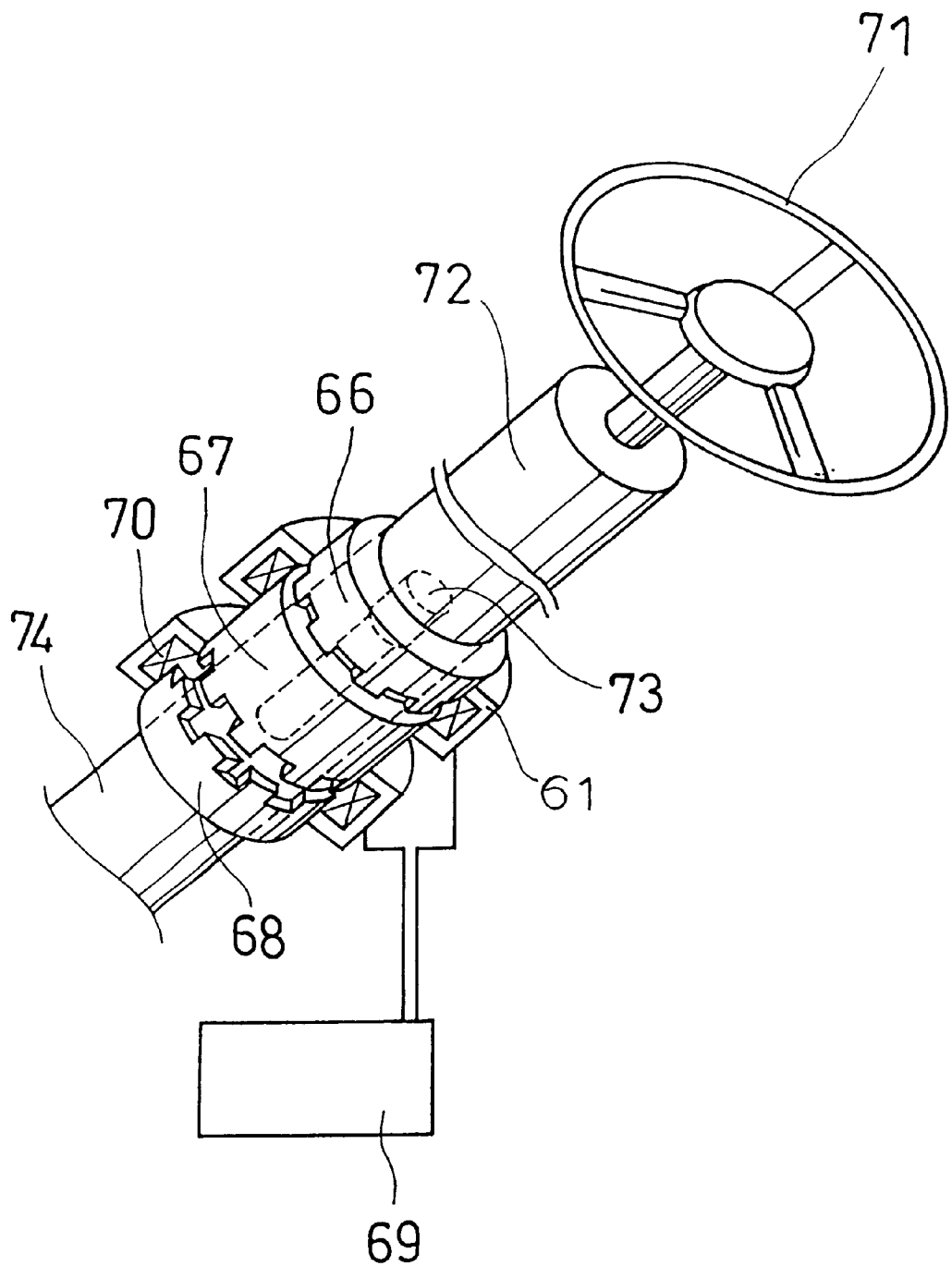
FIG. 5 is a perspective view shoving an outer appearance of a torque sensor used in a conventional vehicle steering apparatus.
Figure 6:
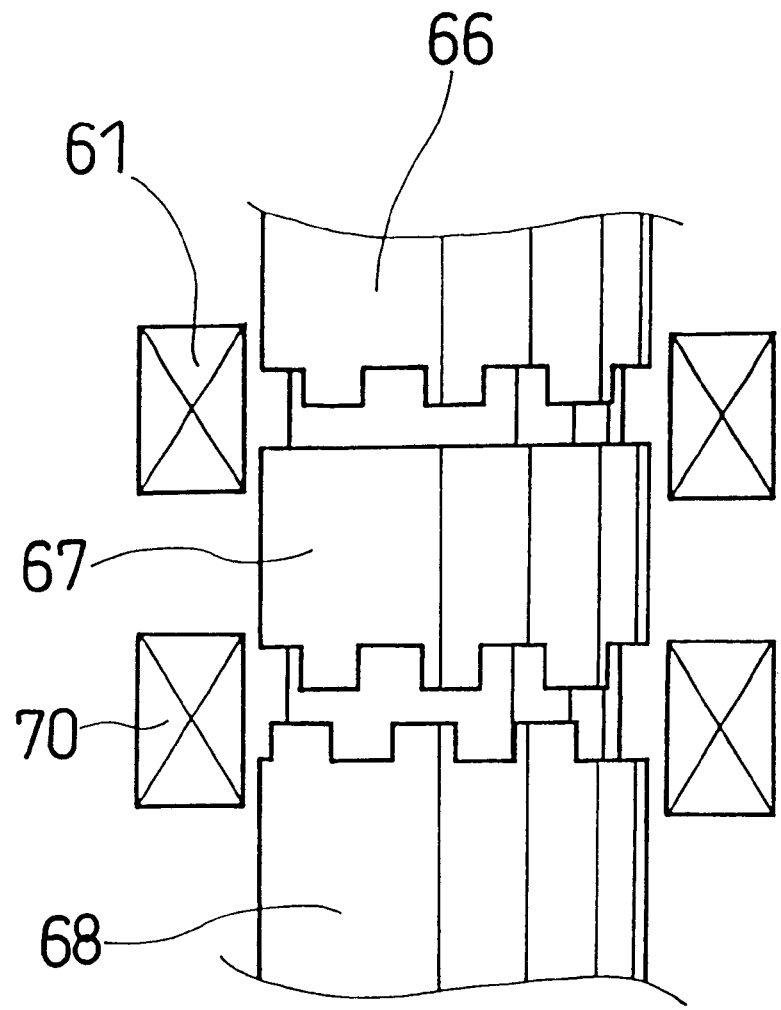
FIG. 6 is an enlarged view showing a part of the torque sensor shown in FIG. 5.
Figure 7:
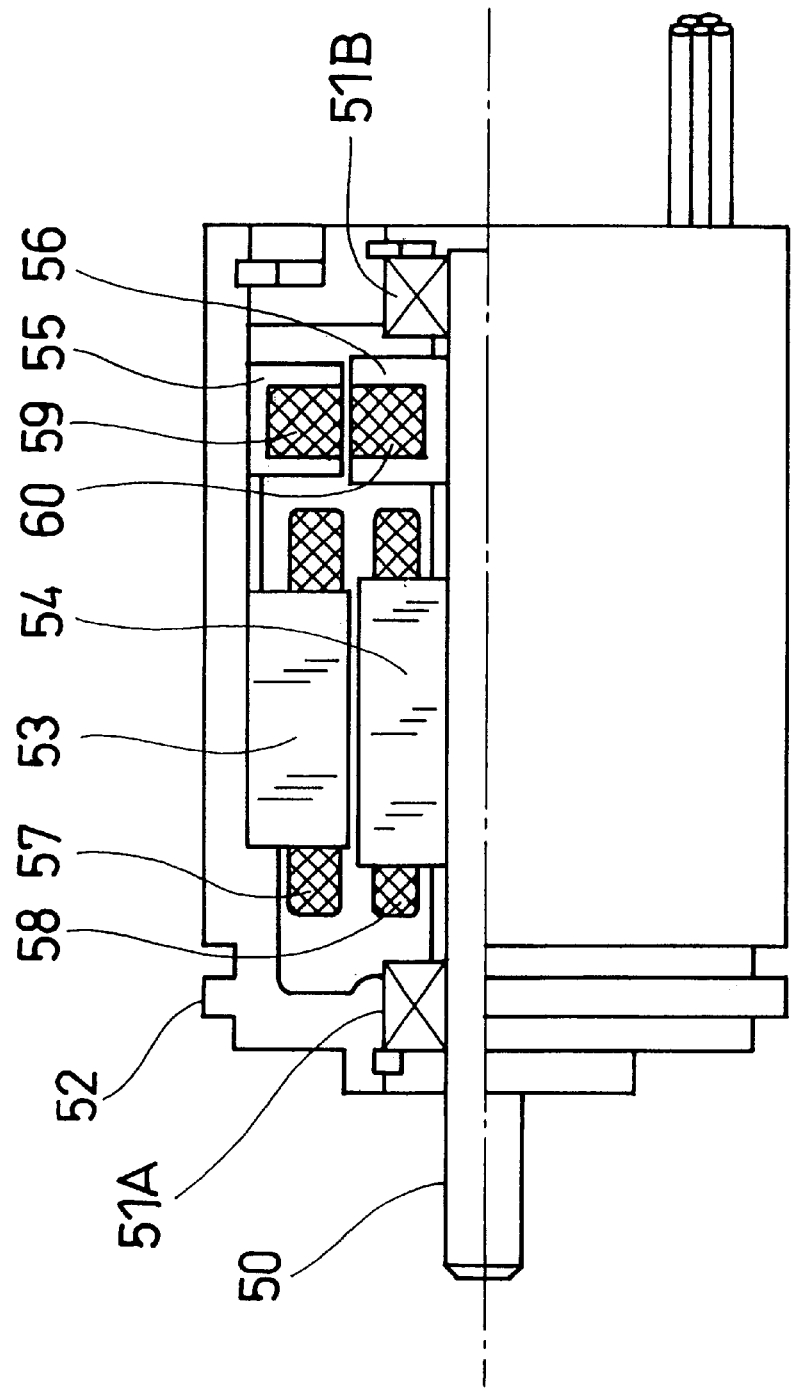
FIG. 7 is an outer appearance view showing a conventional rotary transformer resolver.

FIG. 4 is an enlarged view schematically showing an area surrounding the notched hole 26, in order to explain in more detail the notched hole 26 formed in the first rotor shield plate 25. As shown in the drawing, the notched hole 26 is formed in an inclined position through the first rotor shield plate 25, located in the vicinity of the input shaft 1 (output shaft 3). Specifically, such an inclination should be so formed that it is effective for preventing the direct passing of the magnetic fluxes ($\Phi A$, $\Phi B$ and $\Phi C$ leaking from the magnetic pole 6A, or the magnetic flux $\Phi D$, $\Phi E$ and $\Phi F$ leaking from the inner core 20A) through the notched holes 26.

For example, since an upper shield plate 25$a$ above the notched hole 26 has a relatively high magnetic permeability, the magnetic flux $\Phi B$ directly leaking from the magnetic pole 6A to the notched hole 26 is bent upwardly, so as to return to the magnetic pole 6A by passing through the shield plate 25$a$. Similarly, since a lower shield plate 25$b$ below the notched hole 26 also has a relatively high magnetic permeability, the magnetic flux $\Phi C$ directly leaking to the notched hole 26 is bent downwardly, so as to return to the magnetic pole 6A by passing through the shield plate 25$b$. Further, since the upper shield plate 25$a$ above the notched hole 26 has a relatively high magnetic permeability, the magnetic flux $\Phi D$ directly leaking from the inner core 20A to the notched hole 26 is bent upwardly, so as to return to the inner core 20A by passing through the shield plate 25$a$. In addition, since the lower shield plate 25$b$ below the notched hole 26 has a relatively high magnetic permeability, the magnetic flux $\Phi E$ directly leaking to the notched hole 26 is bent downwardly, so as to return to the inner core 20A by passing through the shield plate 25$b$.

As described above, the inclination of the notched hole 26 is determined by the thickness of the first rotor shield plate 25 and the diameter of the notched hole 26 through which the cross-over wire 9 runs. In other words, such an inclination is allowed to be at any extent, provided that any leaked magnetic flux does not travel straightly, but is changed in its magnetic path by virtue of the first rotor shield plate 25, so as to return to its original position.

The second stator shield plate 28 and the second rotor shield plate 27 are substantially the same as the first stator shield plate 24 and the first rotor shield plate 25 (both of which are shown in FIG. 3) except that there is no notched hole 26 formed in either the second stator shield plate 28 or the second rotor shield plate 27, and that their inner and outer diameters have been adjusted in accordance with the sizes of the magnetic pole 5A and the magnetic pole 6A. In other words, the inner and outer diameters of the second stator shield plate 28 and the second rotor shield plate 27 should be designed such that these plates will not come into contact with each other, but can mutually and sufficiently block magnetic fluxes leaking from the magnetic pole 5A and the magnetic pole 6A.

In the above-described device for measuring torque with high accuracy according to the first aspect of the present invention, since the first and second resolvers have been formed into an integrated structure, and since they are provided in connection with the input shaft and the output shaft, respectively, it is possible to provide an improved device measuring torque with high accuracy and a simple structure.

In the device for measuring torque with high accuracy according to the second aspect of the present invention, it becomes possible to avoid an undesired effect caused by some magnetic fluxes leaking from the inner cores, the resolver excitation windings, the outer cores and the resolver output windings, thereby realizing a device for measuring torque with high accuracy.

In the device for measuring torque with high accuracy according to the third aspect of the present invention, it becomes possible to avoid an undesired effect caused by some magnetic fluxes leaking from the first and second resolvers, thereby realizing a device for measuring torque with high accuracy.

In the device for measuring torque with high accuracy according to the fourth aspect of the present invention, it becomes possible to avoid an undesired effect caused by some magnetic fluxes leaking from the rotary transformers of the first and second resolvers to the resolver excitation winding and the resolver output winding of each resolver, thereby realizing a device for measuring torque with high accuracy.

In the device for measuring torque with high accuracy according to the fifth aspect of the present invention, it is possible for the resolvers to be simplified in their structures, thereby desirably reducing steps for assembling the resolvers.

In the device for measuring torque with high accuracy according to the sixth and seventh aspects of the present invention, it is possible to uniformly reduce a gap formed between every two adjacent shield plates, thereby making it possible to improve a shielding effect for each resolver.

In the device for measuring torque with high accuracy according to the eighth aspect of the present invention, since the notched hole formed in the shield plate is located close to either the output shaft or the input shaft, it is possible to obtain the following effects. Namely, when the output shaft is formed by a magnetic material, among the magnetic fluxes leaking from the magnetic pole and the inner core, the leaked magnetic flux passing close to the output shaft is allowed to return from the output shaft to the magnetic pole or the inner core. Accordingly, it is possible to eliminate an undesired influence brought about by the magnetic flux leaking from the magnetic flux and the inner core, thereby realizing a device for measuring torque with high accuracy.

What is claimed is:

1. A device for measuring torque with high accuracy comprising:

a first resolver and a second resolver which are formed in an integrated structure, each of the first and second resolvers including a rotor having a resolver excitation winding and a stator having a resolver output winding for outputting X and Y components of each rotation angle in accordance with the rotation of the rotor, wherein one end of the rotor of the first resolver is fixed with an input shaft combined with a steering wheel, and the other end of the rotor of the second resolver is fixed with an output shaft combined with vehicle wheels, while the input shaft and the output shaft are both fixed with a torsion bar.

2. A device for measuring torque with high accuracy according to claim 1, including inner cores formed on the rotors of the first and second resolvers, which the inner cores have rotary transformer output windings; outer cores formed on the stators of the first and second resolvers, which the outer cores have rotary transformer excitation windings; the inner cores and the rotary transformer output windings as well as the outer cores and the rotary transformer excitation windings together form a rotary transformer, providing such a structure that voltages induced in the rotary transformer output windings by virtue of the rotary transformer are applied to the resolver excitation windings of the rotors, thereby obtaining output voltages corresponding to actual rotation angles of the rotors from the resolver output windings, wherein a first shield plate is disposed between the inner core and the resolver excitation winding; and a second shield plate is disposed between the outer core and the resolver output winding;

the first shield plate is formed with a notched hole allowing passing therethrough of a cross-over wire for use in connecting the rotary transformer output winding with the resolver excitation winding; and the notched hole is formed as having a slope and extending between the rotary transformer output winding and the resolver excitation winding.

3. A device for measuring torque with high accuracy according to claim 1, wherein shield plates are provided between the first and second resolvers.

4. A device for measuring torque with high accuracy according to claim 1, wherein the first and second resolvers are arranged opposite to each other, the resolver excitation windings of the two resolvers are arranged opposite to each other, and the resolver output windings of the two resolvers are also arranged opposite to each other.

5. A device for measuring torque with high accuracy according to claim 3, wherein the shield plates provided between the first and second resolvers are respectively disposed between the resolver excitation windings and the resolver output windings.

6. A device for measuring torque with high accuracy according to claim 3, wherein each shield plate provided between the first and second resolvers is a ring-like member.

7. A device for measuring torque with high accuracy according to claim 2, wherein the first and second shield plates are ring-like members.

8. A device for measuring torque with high accuracy according to claim 2, wherein the notched hole formed in the first shield plate is located close to either the output shaft or the input shaft.

9. A device for measuring torque with high accuracy according to claim 2, wherein the first and second resolvers are arranged opposite to each other, the resolver excitation windings of the two resolvers are arranged opposite to each other, and the resolver output windings of the two resolvers are also arranged opposite to each other.

10. A device for measuring torque with high accuracy according to claim 3, wherein the first and second resolvers are arranged opposite to each other, the resolver excitation windings of the two resolvers are arranged opposite to each other, and the resolver output windings of the two resolvers are also arranged opposite to each other.

11. A device for measuring torque with high accuracy according to claim 5, wherein each shield plate provided between the first and second resolvers is a ring-like member.

* * * * *